United States Patent [19]

Christensen et al.

[11] Patent Number: 4,916,703
[45] Date of Patent: Apr. 10, 1990

[54] HANDLING ERRORS IN THE C BIT OF A STORAGE KEY

[75] Inventors: Neal T. Christensen, Wappingers Falls; Steven T. Comfort, Poughkeepsie; Robert J. Hurban, Old Bethpage; Bruce L. McGilvray, Pleasant Valley; Arthur J. Sutton, Cold Spring; James R. Urquhart, Fishkill; David R. Willoughby, Poughkeepsie, all of N.Y.

[73] Assignee: International Business Machines Corporation, Armonk, N.Y.

[21] Appl. No.: 276,736

[22] Filed: Nov. 28, 1988

[51] Int. Cl.⁴ .................. G06F 11/10; G06F 11/30; G06F 12/12; G06F 12/16
[52] U.S. Cl. .................. 371/51.1; 364/265.3; 364/266.3; 364/266.5; 364/958.1; 371/13
[58] Field of Search .................. 371/13, 51.1; 364/200 MS File, 900 MS File

[56] References Cited

U.S. PATENT DOCUMENTS 4,514,847 4/1985 Tateishi et al. .................. 371/51
4,658,356 4/1987 Shiozaki et al. .................. 364/200

OTHER PUBLICATIONS

IBM Technical Disclosure Bulletin, vol. 22, No. 5, 10/78, p. 2008, "Replacement of SSK Instruction in a Paging Environment", R. S. Burchi et al.
IBM Technical Disclosure Bulletin, vol. 22, No. 6, 11/79, pp. 2380-2381, "Prevention of Unnecessary Machine Checks Caused by Reference and Change Bit Parity Errors", S. G. Hogan et al.
IBM System/370 Extended Architecture Principles of Operation, Publication No. SA22-7085-1.

Primary Examiner—Charles E. Atkinson
Assistant Examiner—Stephen M. Baker
Attorney, Agent, or Firm—Floyd A. Gonzalez

[57] ABSTRACT

A method of handling errors in the C bit of a storage key by modifying the INSERT STORAGE KEY (ISK) and the RESET REFERENCE BIT (RRB) instructions. If an error is found in the C bit during the execution of these instructions, microcode is instructed to refresh the C bit. The C bit is interrogated a second time to determine if the refreshed C bit is still in error. If the refreshed C bit is not in error a second time, then the first error was caused by a soft or transient error, and the instruction is continued. If the refreshed C bit is in error a second time then the first and second errors were caused by a permanent error such as a stuck bit, and a system recovery machine check error is generated. The handling of C bit errors is thus done in a dynamic fashion as the instructions are executed.

9 Claims, 3 Drawing Sheets

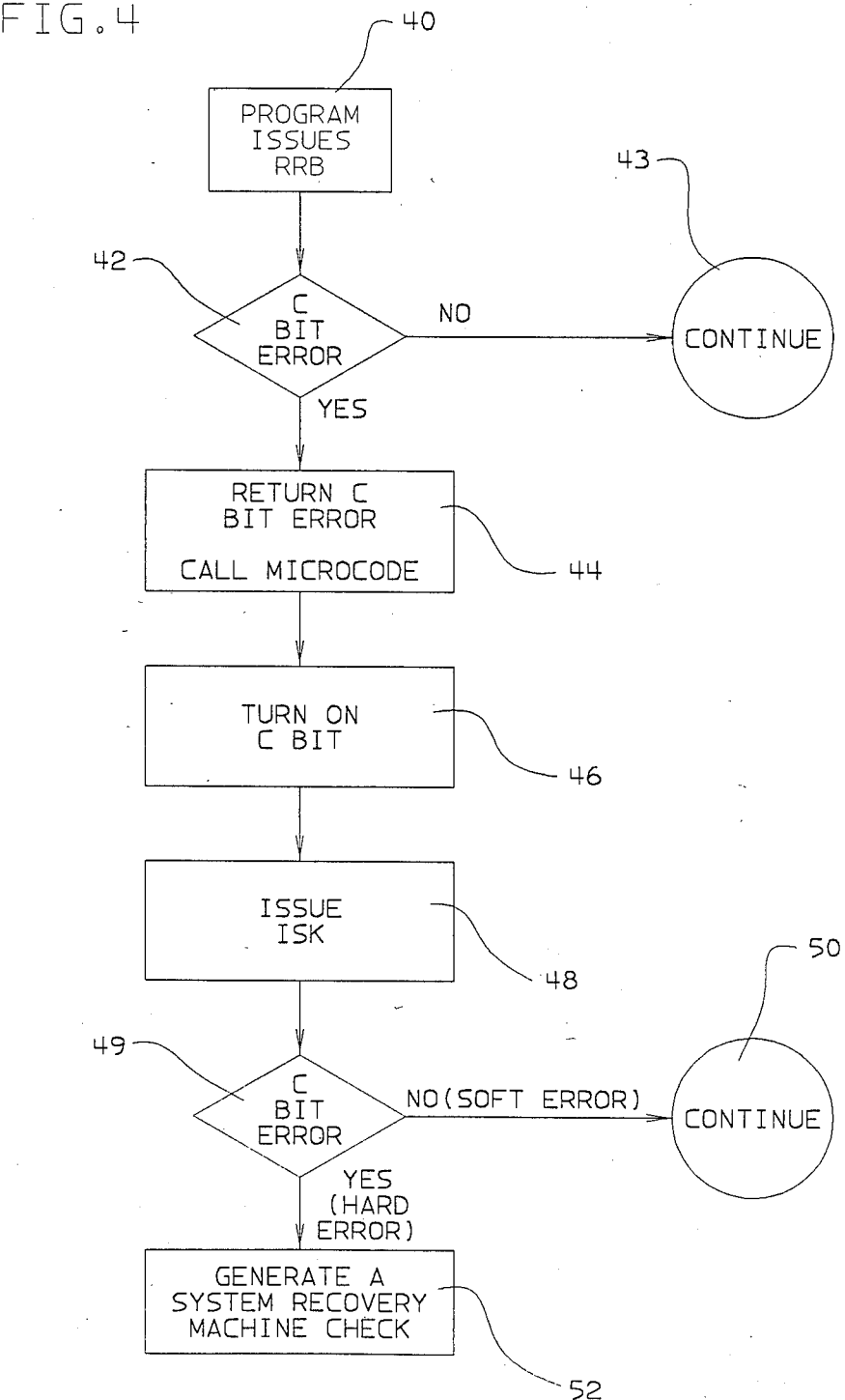

HANDLING ERRORS IN THE C BIT OF A STORAGE KEY

BACKGROUND OF THE INVENTION

The present invention relates to a key storage error testing method which dynamically determines if an error in a storage key of a data processing system results from a hard or soft error.

A data processing system includes a main storage 10 of FIG. 1 which is directly addressable. Both data and programs must be loaded into the main storage 10 from input devices (not shown) before they can be processed. In many systems, such as those using the IBM System/370 architecture, the main storage 10 is available in multiples of blocks 12. In the System/370 architecture, each block is made up of 4 K bytes of storage.

A storage key 14 shown in FIG. 2 is associated with each block 12 of main storage 10. In the storage key 14, bits 0-3 are Access-Control Bits (ACC). If a reference is subject to key-controlled protection, the four ACC bits are matched with a four-bit access key when information is stored, or when information is fetched from a location that is protected against fetching. Bit 4 of the storage key 14 is a Fetch-Protection Bit (F). If a reference is subject to key-controlled protection, the F bit controls whether key-controlled protection applies to fetch-type references. A zero F bit indicates that only store-type references are monitored and that fetching with any access key is permitted. A one F bit indicates that key controlled protection applies to both fetching and storing. No distinction is made between the fetching of instructions and of operands. Bit 5 is a Reference Bit (R). The R bit normally is set to one each time a location in the corresponding storage block 12 is referred to, either for storing or for fetching of information. Bit 6 is a Change Bit (C). The C bit is set to one each time information is stored at a location in the corresponding storage block 12.

Storage keys are not part of addressable storage. In machines having the IBM System/370 architecture, the entire storage key is inspected by the INSERT STORAGE KEY (ISK) instruction. Also in such machines, the RESET REFERENCE BIT (RRB) instruction inspects the reference and change bits and sets the reference bit to zero. The present invention provides for modifying the mentioned instructions to determine if an error in the C bit was caused by a hard error or a soft error.

The memory management of the IBM System/370 architecture by storage keys is well understood in the art, and is described in the IBM SYSTEM/370 EXTENDED ARCHITECTURE PRINCIPLES OF OPERATION, Publication Number SA22-7085-1 available from International Business Machines Corporation, Armonk, N.Y.

The article "REPLACEMENT OF SSK INSTRUCTION IN A PAGING ENVIRONMENT", Burchi et al., IBM Technical Disclosure Bulletin, Vol. 22, No. 5, October 1978, discloses a Reset Change Bit instruction to reset the C bit in the Storage Key to eliminate overhead after each page-in.

The article "PREVENTION OF UNNECESSARY MACHINE CHECKS CAUSED BY REFERENCE AND CHANGE BIT PARITY ERRORS", Hogan et al., IBM Technical Disclosure Bulletin Vol. 22, No. 6, November 1979 discloses a mechanism to signal the data processing system to take a system damage machine check in the event of a parity error in the R or C bits.

U.S. Pat. No. 4,658,356 to Shiozaki et al. for "CONTROL SYSTEM FOR UPDATING A CHANGE BIT", Apr. 14, 1987, discloses a control system which can perform the updating of a C bit faster and which reflects a correct C bit.

U.S. Pat. No. 4,514,847 to Tateishi et al. for "KEY STORAGE ERROR PROCESSING SYSTEM", Apr. 30, 1985 discloses a system wherein parity errors of the R bit or the C bit do not result in system breakdown. When the main storage key is read out, a parity check takes place. If a parity error is detected, the reference bit is set to a value indicating that an access is in progress, and the change bit is set to a value for indicating that a change was made. Further, a parity bit is added and the main storage key is rewritten.

SUMMARY OF THE INVENTION

A data integrity exposure exists when a C bit is stuck at zero such as by a hard error and a subsequent soft error on the corresponding parity bit makes the change bit error undetectable. Therefore, an object of the present invention is to provide a means to dynamically handle errors in the C bit, whether caused by a hard error or a soft error.

It is another object of the present invention to provide a means to continue operation if an error in the C bit was caused by a soft error.

It is another object of the present invention to provide a means to continue operation after a soft error of the C bit without the loss of information.

The foregoing and other objects, features and following more particular description of the preferred embodiment of the invention as illustrated in the drawings.

BRIEF DESCRIPTION OF THE DRAWINGS

FIG. 4 is a flowchart of a portion of the RESET REFERENCE BIT (RRB) instruction of the present invention.

DESCRIPTION OF THE PREFERRED EMBODIMENT

As is known, a computer program is made up of instructions which are coded by a user to be executed in a sequential manner. Each instruction is typically executed by performing one or more microcode instructions. Microcode may be generally defined as that code which is below the user interface and not accessible to the user. The present invention is preferably implemented by additions to the microcode of the prior ISK and RRB instructions.

It will be understood that, as used herein, a hard error is an error of a permanent nature such as when a memory cell is stuck in a one or zero condition, and a soft error is a temporary or transient error such as when an alpha particle removes the charge from a memory cell changing its value from either a one to a zero or a zero to a one, dependent upon the convention used.

Figure 1:
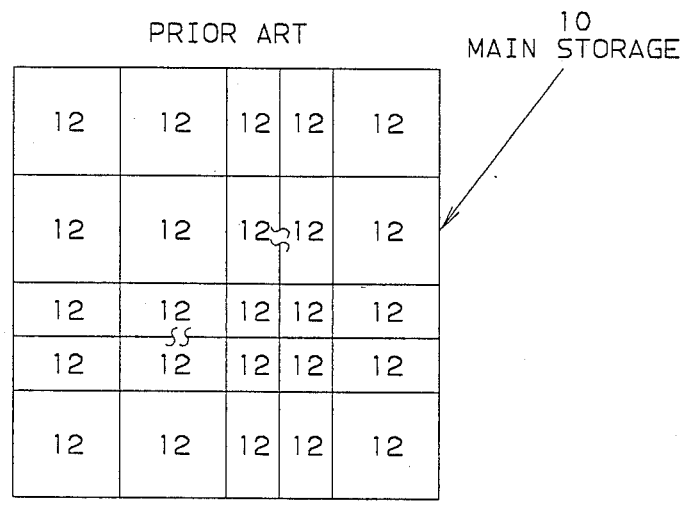
FIG. 1 illustrates the main storage of a data processing system wherein the main storage is divided into blocks.
Figure 2:
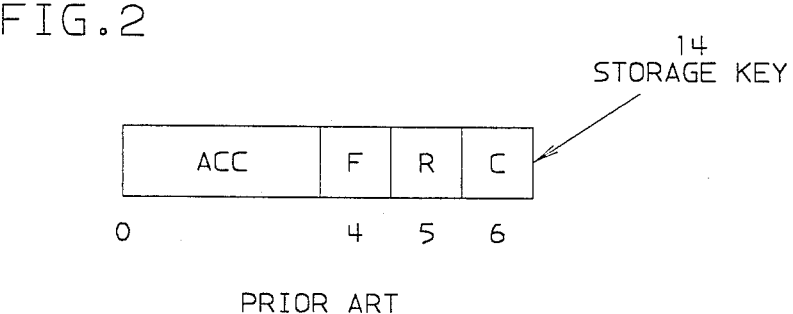
FIG. 2 illustrates one of the storage keys of the main storage of FIG. 1.
Figure 3:
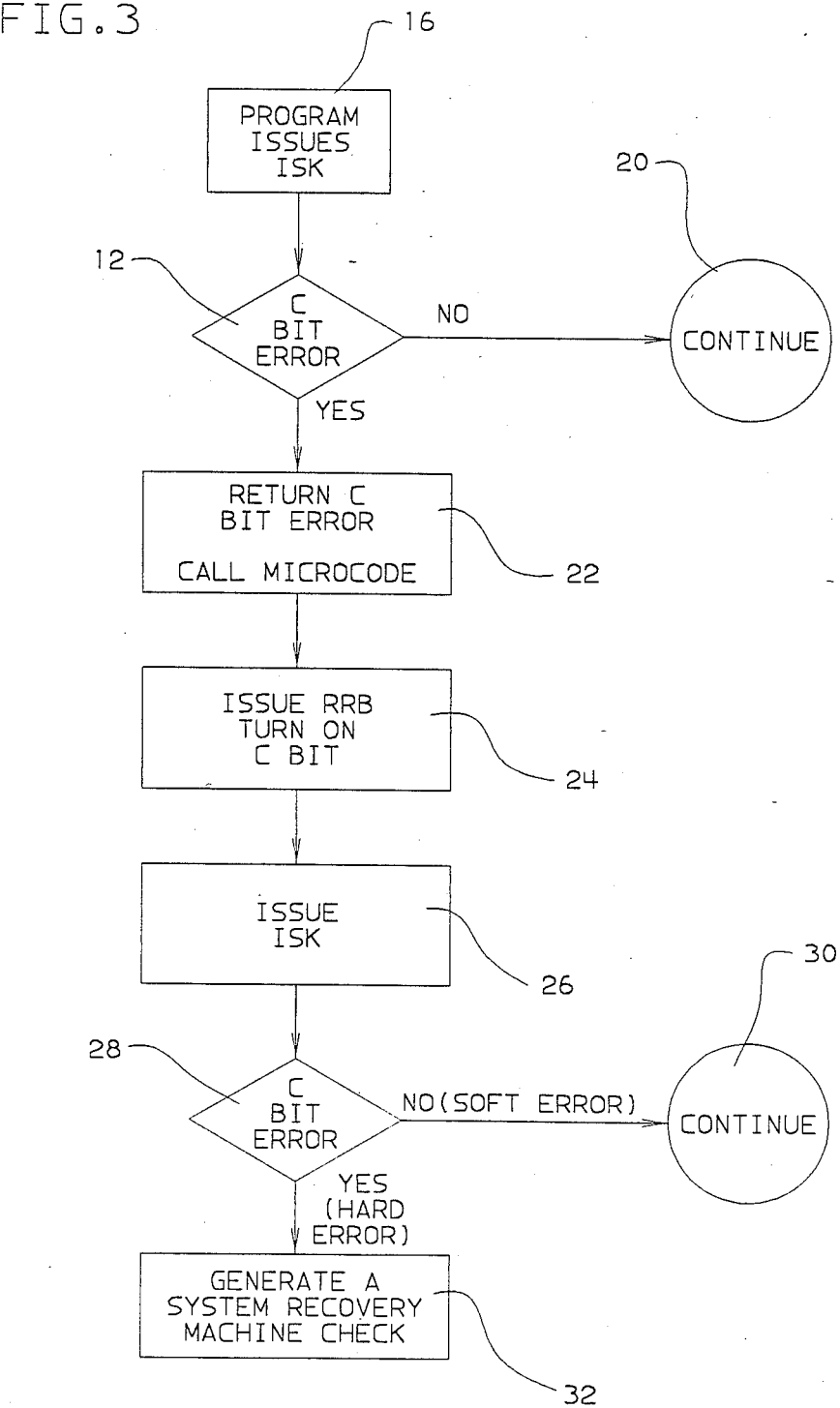
FIG. 3 is a flowchart of a portion of the INSERT STORAGE KEY (ISK) instruction of the present invention.

FIG. 3 is a flowchart of that portion of the microcode of the ISK instruction wherein at 16 the user coded program issues an ISK instruction. In the course of the microcode for the ISK instruction, a check is made at 18 to see if the C bit is in error. This may be done by interrogating the C bit and its parity bit to see if they correspond. If the C bit is correct, that is there is no C bit error at 18, the ISK microcode continues at 20. If there is a C bit error at 18, a C bit error is returned to system hardware (not shown) such that the system is informed that an error has occurred and a further microcode routine is called as shown at 22.

At 24, the microcode routine called at 22 issues an RRB instruction to turn on the C bit, as will be explained in connection with FIG. 4. Turning on the C bit indicates that a change has been made. It will be understood that this is done to insure that a change is always indicated in case, for instance, a change was made and a soft error turned the C bit off. If the error detected at 18 was caused by a soft error, turning on the C bit at 24 typically will not result in a second error since the occurrence of a second soft error in the C bit or its parity bit at this time would be very unlikely. The turning on or refreshing of the C bit will also provide the correct or corresponding value to its parity bit, in accordance with the parity convention used. At 26, the microcode issues an ISK instruction which checks for a C bit error at 28. If a second C bit error is not detected at 28, this means that the C bit error detected at 18 was caused by a soft error, and the ISK microcode program continues at 30. If a second C bit error is detected at 28, this means that the C bit error detected at 18 was caused by a hard error and continued operation may result in a data integrity problem. Thus at 32, a system recovery machine check error is generated to inform the system hardware that a proper system recovery routine should be invoked.

FIG. 4 is a flowchart of the position of the RRB instruction wherein at 40 the user coded program issues an RRB instruction. In the course of the microcode for the RRB instruction, a check is made at 42 to see if the C bit is in error. As in the case of the ISK instruction, this may be done by interrogating the C bit and its parity bit to see if the correspond. If the C bit is correct, that is there is no C bit error at 42, the RRB microcode continues at 43. If there is a C bit error at 42, a C bit error is returned to the system hardware such that the system is informed that an error has occurred and a further microcode routine is called as shown at 44.

At 46, the RRB instruction turns on the C bit to indicate that a change has been made. This is a modification of the prior RRB instructions which only turned on the R bit. As in the case of the ISK instruction, turning on the C bit insures that a change is always indicated in case, for instance, a change was made and a soft error turned the C bit off. As previously explained, if the error detected at 42 was caused by a soft error, turning on the C bit at 44 typically will not result in a second error since the occurrence of a second soft error in the C bit or its parity bit at this time would be very unlikely. At 48, the microcode issues an ISK instruction which checks for a C bit error at 49. If a second C bit error is not detected at 49, this means that the C bit error detected at 42 was caused by a soft error, and the RRB microcode program continues at 50. If a second C bit error is detected at 49, this means that the C bit error detected at 42 was caused by a hard error and continued operation may result in a data integrity problem. Thus at 52, a system recovery machine check error is generated to inform the system hardware that a proper system recovery routine should be invoked.

In the present invention, hard and soft errors are detected in a dynamic fashion as each ISK or RRB instruction is executed. Also, errors to the C bit are corrected to always indicate a change so that no data changes will be lost as a result of a soft error. Also, soft errors to the C bit are dynamically corrected with little overhead as ISK or RRB instructions are being executed.

Even though the preferred embodiment is disclosed in connection with the main storage and storage keys of a data processing system, it will be understood that the present invention may be used with other storage means such as expanded storage or storage caches which have been divided into blocks, with access to the blocks being controlled by access keys or locks containing change bits.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described our invention, what we claim as new, and desire to secure by Letters Patent is:

1. In a data processing system having a main storage divided into blocks, an access key for each block, a change bit in each access key indicating whether information has been written into the corresponding block, and a parity bit for indicating if said change bit is in error, a method for handling errors in said change bit, said method comprising:
   issuing a command under program control which accesses said change bit and its parity bit;
   determining from said change bit and its parity bit if a parity error exists;
   in the event that a parity error does exist, completing the steps of:
   refreshing said change bit;
   testing said change bit and its parity bit to determine if a second parity error exists; and
   in the event said second parity error does exist, generating a system recovery machine check thereby indicating a hard error exists.

2. The method of claim 1 wherein the refreshing of said change bit comprises turning said change bit on for indicating a value of one, and providing a correct parity bit for the turned on change bit.

3. The method of claim 1 further comprising, before refreshing said change bit step, returning a change bit error to said data processing system.

4. The method of claim 1 wherein said command under program control is an INSERT STORAGE KEY (ISK) instruction.

5. The method of claim 4 wherein said testing said change bit is an ISK instruction.

6. The method of claim 5 wherein said refreshing said change bit step is done by a modified RESET REFERENCE BIT (RRB) instruction which has been modified to refresh said change bit.

7. The method of claim 1 wherein said command under program control is a RESET REFERENCE BIT (RRB) instruction.

8. The method of claim 7 wherein said refreshing said change bit step is done by said RRB instruction.

9. The method of claim 8 wherein said testing of said change bit step is done by an INSERT STORAGE KEY (ISK) instruction.

* * * * *